Patented Jan. 26, 1926.

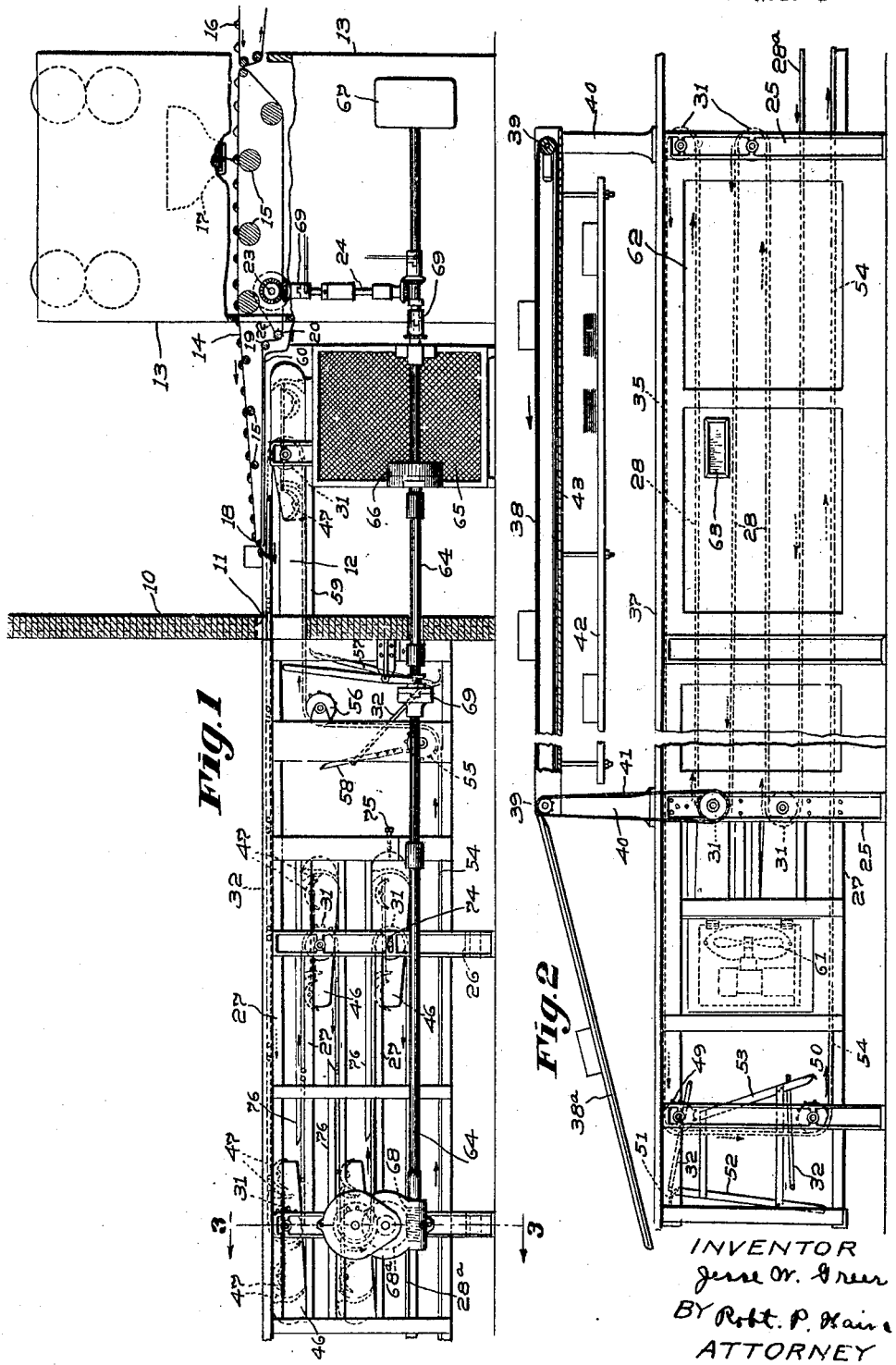

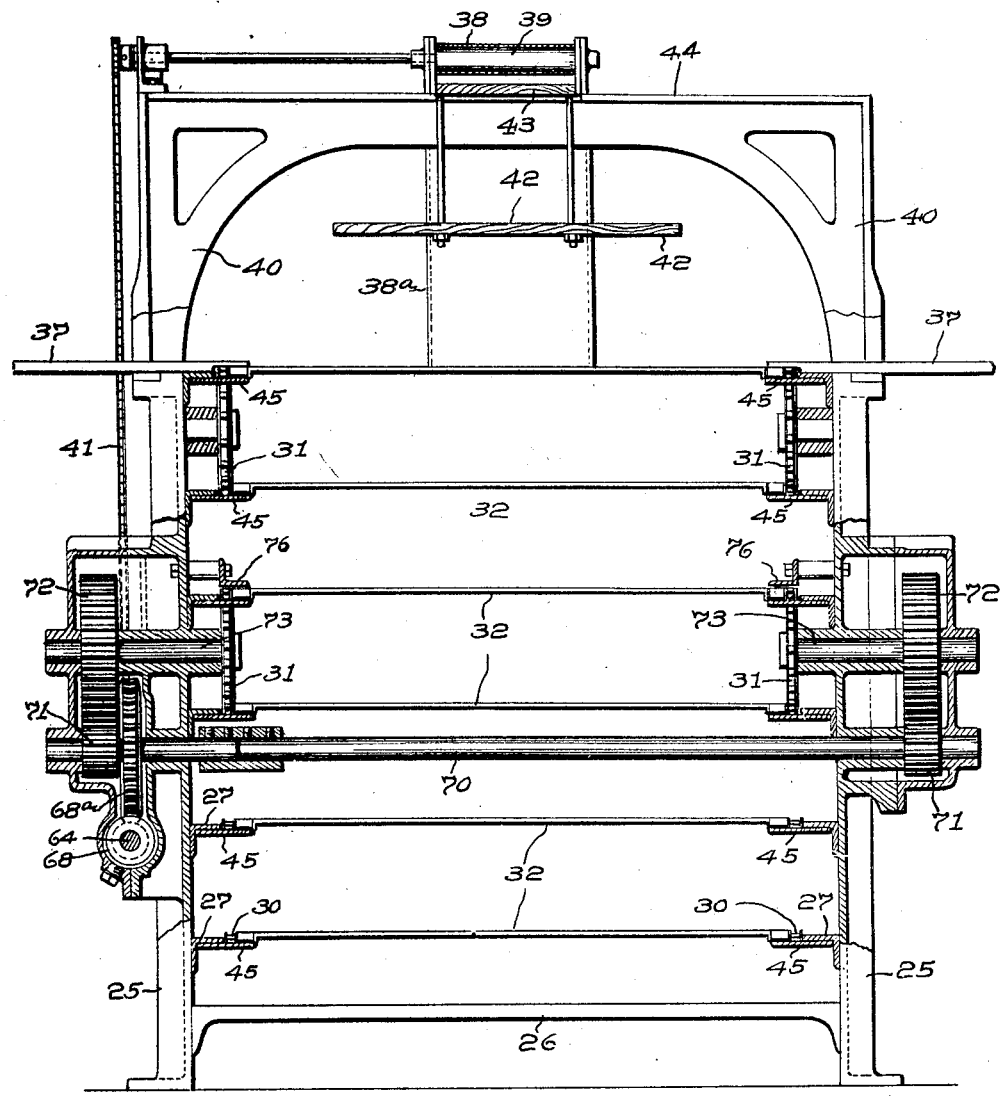

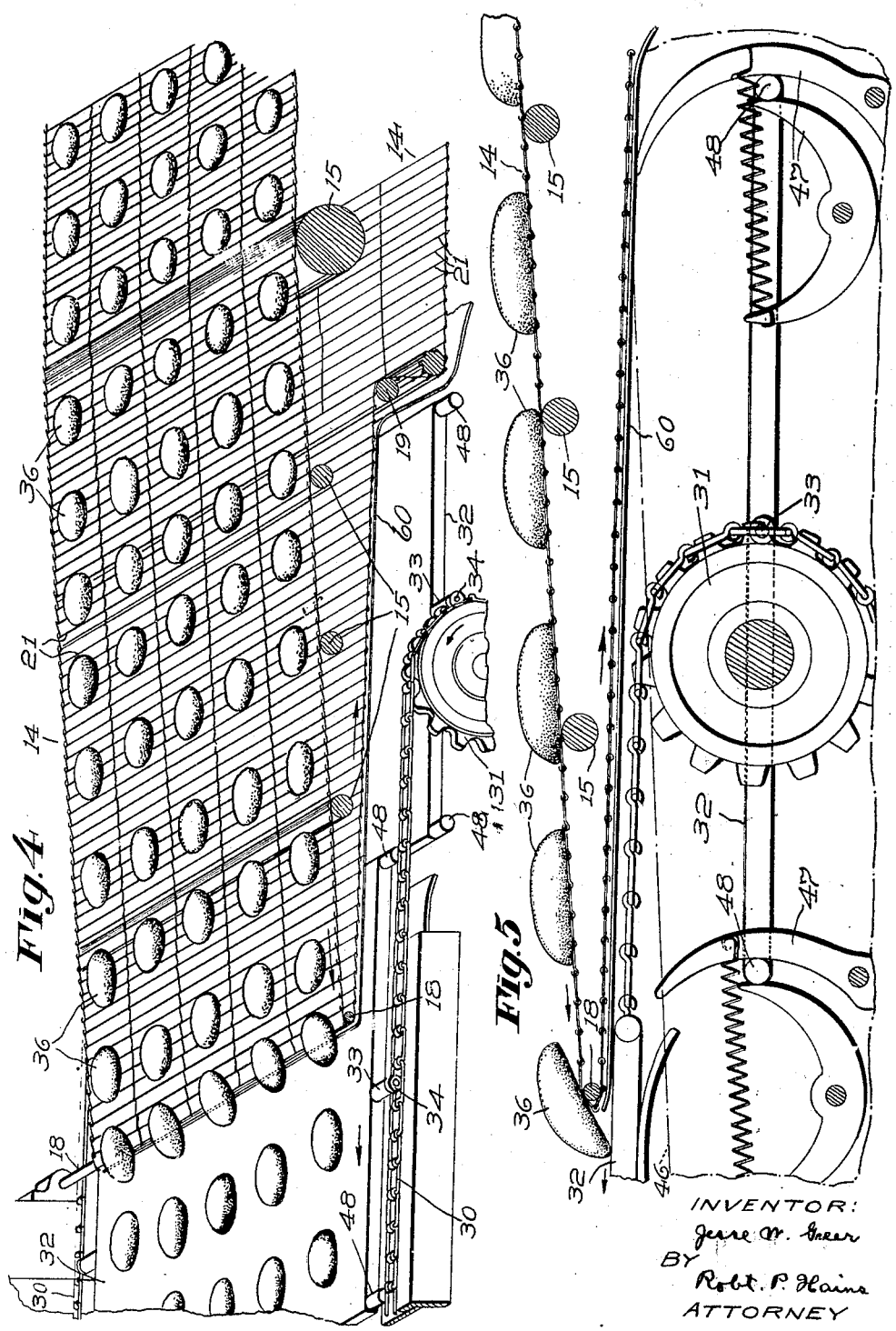

1,571,052

UNITED STATES PATENT OFFICE.

JESSE W. GREER, OF CAMBRIDGE, MASSACHUSETTS.

COATING AND DRYING MACHINE.

Application filed September 11, 1922. Serial No. 587,324.

*To all whom it may concern:*

Be it known that I, JESSE W. GREER, a citizen of the United States, and a resident of Cambridge, in the county of Middlesex and State of Massachusetts, have invented an Improvement in Coating and Drying Machines, of which the following description, in connection with the accompanying drawings, is a specification, like characters on the drawings representing like parts.

This invention relates to conveyors and more particularly to a confection conveying and drying apparatus adapted to cooperate with a confection coating machine.

In the manufacture of coated candy or cakes the chocolate or other coating material is applied in the liquid state and is then dried on the confection which it coats. Chocolate coating machines are now commonly used by the manufacturers of coated confections, and in these machines the candy or cakes are usually advanced by a conveyor under a stream of liquid chocolate so that the coating is deposited thereupon. The confections are then subjected to a drying operation, after which they may be packed in boxes or other containers ready for market.

In the manufacture of coated confections on a large scale, the cost of production may be reduced and various hand operators may be eliminated by keeping the confections moving continuously from the time they enter the coating machine until they are dried and packed in the containers ready for the market. In my patent, No. 1,321,520, granted November 11, 1919, a machine is shown, described and claimed which is provided with an endless conveyor for advancing carriers or trays back and forth along different runs, so that the material upon the carriers will have time to dry before it reaches the portion of its path of travel where it is removed.

The present invention contemplates a construction in which a conveyor machine embodying features of my patent above mentioned is associated with a coating machine so that the coated confections will be delivered by the conveyor of the coating machine onto the carrier of a conveying and drying machine.

The chocolate used for coating purposes is normally of such consistency that it becomes hard when allowed to cool to normal atmospheric temperature, and is maintained in a liquid state while being applied by the application of heat. It is therefore desirable to maintain the chocolate coating machine or machines in a different room from that in which the conveying and drying machines operate, so that the air of the room of the drying machines may be kept at a lower temperature than that of the room of the coating machine.

One important feature of the present invention, therefore, resides in a construction by which the carriers of the conveying and drying machine may be conducted through an opening in a wall of a room and into position to have confections deposited thereupon by the conveyor of a coating machine.

Another feature of the present invention resides in means for tilting the carriers of the endless conveyor as they move vertically through the distance of a plurality of runs to empty the crumbs from the carriers.

Other features of the invention and novel combination of parts in addition to the above will be hereinafter described in connection with the accompanying drawings which illustrate one good practical form thereof.

In the drawings:

Fig. 1 is a side view of a coating machine having a conveying and drying machine associated therewith in accordance with the present invention, the side wall of the latter being removed;

Fig. 2 is a continuation of the conveying and drying machine of Fig. 1;

Fig. 3 is an enlarged sectional view taken on the line 3—3 of Fig. 1;

Fig. 4 is an enlarged perspective view of the cooperating portions of the two machines; and Fig. 5 is an enlarged side view of parts shown in Fig. 4.

In the embodiment of the invention illustrated in the drawings, the coating machine is shown to the right hand side of a wall 10 of a building and the conveying and drying machine is shown to the left hand side of this wall, and the wall 10 has an opening 11 therethrough through which an extension 12 of the conveying and drying machine projects.

The coating machine shown to the right hand side of the wall 10 for the most part may be of any usual or preferred construction and consists of an enclosed casing 13 in which an endless carrier 14 is mounted.

This carrier is supported by a plurality of transversely extending rollers 15 and the confection to be coated may be delivered to the conveyor 14 by an endless carrier 16. As the confections are advanced by the endless conveyor 14 through the coating machine, they pass under a pan 17 from which chocolate or other coating material is caused to drop upon the confection. In the construction shown the endless conveyor 14 extends outwardly a substantial distance from one side of the casing 13 and the conveyor passes around a small rod or roller 18 at the end of its upper run, so that the upper and lower runs of the portion of the conveyor adjacent the roller 18 lie in close proximity, as will be apparent from Figs. 1, 4 and 5, and the lower run of the conveyor passes over a roller 19 and under a toothed roller 20 which latter serves to drive the conveyor. The conveyor 14 preferably has an open construction which allows the excess chocolate or other coating material to pass therethrough and may be constructed of transversely extending wires 21 which are connected in such a way that the conveyor may readily bend about the different rolls in its path of travel. The teeth of the driving roller 20 are positioned to engage the transversely extending wires 21 to form a positive driving engagement between the roller 20 and conveyor 14. This roller may be driven by a chain 22 which passes around sprockets on the roller 20 and shaft 23, the latter of which may be driven from a vertical shaft 24.

The conveying and drying apparatus may be given any desired length depending on the length of travel it is desired to impart to the endless conveyor with which the same is provided. In the present construction the conveying and drying machine is provided with a relatively long frame having spaced vertical posts 25 connected by transversely extending beams 26 and the posts 25 are connected by longitudinally extending angle bars 27. The endless conveyor with which this machine is provided travels longitudinally within the frame along different runs, as indicated by 28, and the endless conveyor consists of side chains 30 at each side of the supporting frame. The side chains 30 preferably serve to advance carriers or trays 32 along different runs within the frame and these carriers preferably are provided with trunnions or stub shafts 33 extending from each side thereof midway between the ends of the carriers, and these stub shafts are journalled or otherwise secured to links 34 of each chain 30.

The carriers or trays 32 are supported in a horizontal position throughout the active portion of their path of travel by means to be described, and in the present case the extension 12 above mentioned is constructed to guide the side chains 30 and the carriers 32 secured thereto through the opening 11 in the wall 10 so that these carriers are brought successively under the discharge end of the conveyor 14 of the coating machine so that the coated confections may be delivered by the conveyor 14 upon the carriers 32, as will be apparent from Fig. 4.

In most cases the coated confections 36 will be delivered to the carriers 32 before they have had a chance to dry and it is therefore desirable to cause these carriers to travel along different runs for a sufficient length of time to allow the confections to dry before they reach the upper run 35 shown in Fig. 2, which is the portion of the path of travel of the carriers where the confections are removed from the carriers. In the present case, as will be apparent from Figs. 1 and 2, the carriers after receiving the confections from the conveyor 14, travel along the upper run of the machine, shown to the left in Fig. 1, through a portion of the length of this machine, and then pass successively about spaced sprockets 31 so that the trays pass downwardly from one run to another until they reach the next to the lowest run 28$^a$ whereupon, as will be apparent from Fig. 2, the trays pass along this run 28$^a$ throughout substantially the entire length of the conveying and drying machine and then pass about spaced sprockets 31, shown in Fig. 2, and upwardly from one run 28 to another until they finally reach the uppermost run 35, above mentioned.

The coated confections 36 should be dried sufficiently by the time they reach the run 35 to be packed in boxes or other containers, and this is commonly done by hand, and to facilitate the hand packing, tables 37, see Fig. 3, are supported by the machine frame at each side of the upper run 35 so that attendants standing or sitting adjacent these tables may remove the confections by hand from the traveling carriers and place them in boxes or other containers resting on the tables. The boxes when filled may be placed upon the endless belt 38 passing about the spaced rolls 39 rotatively supported by uprights 40, and this endless belt may be driven by a chain 41, so that the upper run thereof will travel in the direction indicated by the arrow in Fig. 2 to convey the boxes or packages placed thereupon toward the inclined chute 38$^a$ at one end of the upper run of the endless belt. If desired the boxes or other equipment used in packing the confections may be stored upon a shelf 42. This shelf may be suspended from a board 43 mounted below the lower run of the endless belt 38 and secured to transversely extending portions 44 of upright posts 40. The arrangement just described is such that attendants working at the tables 37 may conveniently reach the boxes or other equipment upon the shelf 42 and may rest them upon the tables 37 until sufficient confections have been placed therein by hand to fill the same, whereupon they may be placed upon the upper run of the endless belt 38 and be conveyed thereby to the inclined chute 38ª.

It is important that the carriers 32 be maintained in a horizontal position as long as the confections remain thereupon and to this end the angle bars 27 which extend longitudinally of the conveying and drying machine are provided with longitudinally extending plates 45 that form slideways upon which the opposite ends of the carriers 32 may rest so that these slideways maintain the carriers in a horizontal position while traveling along the various runs, and to maintain the carriers in a horizontal position while traveling from one run to the other, guide means may be provided consisting of castings 46 secured to the machine frame at one side thereof and adjacent each of the sprockets 31 at this side of the machine. These castings preferably are provided with curved guide means 47 which are adapted to engage lugs 48 upon each carrier 32 at one end thereof and in spaced relation to the central trunnion 33 of these carriers. The arrangement is such that the lugs 48 are engaged by the curved members 47 as a carrier reaches the end of a run and the carrier is held by these curved members in substantially a horizontal position while passing either up or down to the next run, as more fully disclosed in my patent above mentioned.

By the time the carriers 32 have completed their travel along the upper run 35, shown in Fig. 2, all the confections upon these carriers should have been removed therefrom by the attendants, and it is desirable to tilt these carriers as they reach the end of this run so as to empty from the carriers any crumbs that may remain on the same, and to this end the side chains 30 of the carriers upon reaching the end of the upper run 35 pass about the upper sprockets 49 downwardly to near the bottom of the machine and then about the sprockets 50, and while passing downwardly one lug 48 of each carrier is caused to engage a guide 51 which supports this lug temporarily while the carrier is being moved downwardly by the endless chains to which it is secured, so that each carrier while passing downwardly is tilted to a comparatively steep angle and as the carriers move downwardly they are maintained in this tilted position by the guide bar 52 until the carriers approach the lower sprocket 50, whereupon the opposite lug 48 of each carrier may engage a second guide bar 53 which serves to swing the carriers to the horizontal position as they approach the lower run 54 of the endless conveyor. The means just described for tilting the carriers 52 serves not only to dump the crumbs therefrom but also to prevent the edge of one carrier from striking another as they change their direction of travel in passing downwardly about the upper sprocket 49.

The carriers pass along this lower run 54 throughout the length of the machine shown in Figs. 1 and 2, until they reach a pair of sprockets 55 adjacent the right hand end of this machine, whereupon the side chains 30 are guided upwardly by the elevated sprockets 56 and from these sprockets they pass through the opening 11 in the wall 10 toward sprockets 31 supported below the conveyor 14 by the extension 12. As the carriers pass upwardly from the sprockets 55 towards the sprockets 56 they may be again tilted by guide bars 57 and 58, and the former serves to tilt the carriers while the latter serves to swing the carriers to a substantially horizontal position as they pass about the upper sprockets 56. The carriers while passing from the sprockets 56 along the extension 12 may be maintained in a horizontal position by the slideway 59 upon which they may rest, and as they move upwardly to a position directly below the lower run of the conveyor 14 they are maintained in a horizontal position by the guide means 47.

The present construction is such that the carriers 32 are advanced successively under the delivery end of the conveyor 14 and in close proximity to the upper run of this conveyor so that the confections will be deposited upon the carriers by the conveyor without being injured, as will be apparent from Figs. 4 and 5, whereupon the carriers will be advanced along the various runs described, until they finally reach the run 35 from which the confections may be removed by hand and placed in boxes or containers. It is desirable to prevent the chocolate or other coating which may drip from the upper and lower runs of the conveyor 14 from falling upon the carriers 32 and to this end an apron 60 may be supported directly below the lower run of the conveyor 14 so that the particles which are deposited upon this apron may be moved by the lower run of the conveyor along the apron into the casing 13.

It may be desirable to promote drying of the confections upon the various carriers 32 by causing air currents to pass over and about these carriers and to this end a fan 61 preferably is mounted within the frame of the conveying and drying machine near the left hand end thereof, as shown in Fig. 2, so that it will force air lengthwise of this frame, and the sides of the frame may be closed by walls 62 which prevent air from escaping from the interior of the frame through either side thereof. One or more windows 63 may be provided in the sides of the walls so that the condition of the confections being conveyed may be observed.

The various operating parts shown in the drawings preferably are driven from a single source of power, and to this end a horizontally extending shaft 64 is mounted to extend through the wall 10 and is supported along side both machines. This shaft may be driven from a motor (not shown) within the enclosure 65, and a belt passing from the motor just mentioned may extend around a pulley 66 secured to the shaft 64 to rotate the latter. This shaft may serve to drive a pump 67 and the upright shaft 24 of the coating machine, and secured to the opposite end of the shaft 64 is a worm 68 that drives the entire endless conveyor of the conveying and drying machine. Clutches 69 may be provided to control the operation of the various elements driven from the main shaft 64.

The worm 68 which is secured to the main shaft 64 meshes with a worm wheel 68ª that is secured to a transversely extending shaft 70, and adjacent each end of the shaft 70 are provided pinions 71 which rotate gears 72 secured to stub shafts 73, and sprockets 31 are operatively secured to the inner ends of the shaft 73. As a result of this construction a strong positive driving movement is imparted to the stub shafts 73 and to sprockets 31 secured thereto, and rotation of these two sprockets imparts the desired movement to the side chains 30 and the carriers 32. The tension of the side chains 30 may readily be adjusted by mounting one of the castings 46 for adjustment, as shown in Fig. 1, wherein it will be seen that the support for this casting has an elongated slot 74, and an adjustable screw 75 serves to move this casting and the sprocket 31 carried thereby in a direction to increase the tension of one of the chains 30, and a similar construction at the opposite side of the machine may serve to increase the tension of the opposite chain 30.

The endless conveyor travels along the different runs in the direction indicated by arrows, and the chain tightening means just described should be positioned to one side of the chain advancing gears 31 so that the tightening means will take up the slack in the chain which has just left these gears. The chain 41 which serves to drive the endless conveyor belt may be operated from one of the sprockets 31 which is rotated by the movement of the endless chain 30.

The carriers 32 may have a tendency to tilt as they pass out of engagement with the slide ways 45 and before they reach the guiding means 47, and to prevent this, guide bars 76 may be supported by the machine frame just above the slide ways, as shown in Fig. 3.

As a result of the construction described, the coated confections are delivered automatically from the coating machine to the conveying and drying machine, and the coating machine may be operated in a room having one temperature while the conveying and drying machine may be operated in a room having a different temperature.

What is claimed is:

1. A confectionary drying apparatus, comprising in combination an endless conveyor consisting of trays connected to travel as a unit lengthwise of the apparatus along different runs, means for maintaining the trays in a horizontal position while traveling lengthwise of the runs and from one run to the other, and an endless carrier extending over an end portion of the upper run of the conveyor and having an upper run that terminates in close proximity to the surface of the upper run of the conveyor to deposit articles gently upon each tray as it reaches the upper run.

2. A confectionery drying apparatus, comprising in combination an endless conveyor consisting of trays connected to travel as a unit lengthwise of the apparatus along different runs, means for maintaining the trays in a horizontal position while traveling lengthwise of the runs and from one run to the other, an endless open mesh carrier extending over an end portion of the upper run of the conveyor and having an upper run that terminates in close proximity to the surface of the upper run of the conveyor to deposit articles gently upon the trays as they reach the upper run, and a fixed apron supported between the conveyor and carrier to prevent particles that pass through the mesh of the carrier from falling upon the conveyor.

3. A confectionery drying apparatus, comprising in combination a frame, an endless conveyor having trays connected to travel as a unit lengthwise of the frame along different runs, means for maintaining the trays in horizontal position while passing along the different runs and from one run to the other, an extension at one end of the frame adapted to support the upper and lower runs of the conveyor in close proximity for passage through a restricted opening in a wall, and an endless carrier projecting over said extension and having an upper run that terminates in close proximity to the trays traveling along the upper run of the extension to deposit articles gently upon the trays.

4. A confectionery drying apparatus, comprising in combination, a frame, an endless conveyor having trays connected to travel as a unit lengthwise of the frame along different runs, an extension at one end of the frame adapted to support the upper and lower runs of the conveyor in close proximity for passage through a restricted opening in a wall, means upon the extension for maintaining the trays in a horizontal position as they pass from one run to the other, and an endless carrier projecting over said extension and having an upper run that terminates along the upper run of the extension to deposit articles gently upon the trays.

In testimony whereof, I have signed my name to this specification.

JESSE W. GREER.